United States Patent [19]
Hennells

[11] Patent Number: 4,721,289
[45] Date of Patent: Jan. 26, 1988

[54] COMBINED CHECK AND EXHAUST VALVE FOR HIGH PRESSURE GAS SPRING

[75] Inventor: Ransom J. Hennells, Plymouth, Mich.

[73] Assignee: Rantom, Inc., Canton, Mich.

[21] Appl. No.: 934,217

[22] Filed: Nov. 21, 1986

Related U.S. Application Data

[63] Continuation-in-part of Ser. No. 757,969, Jul. 23, 1985, Pat. No. 4,662,616.

[51] Int. Cl.[4] .................................................. F16F 9/43
[52] U.S. Cl. ............................ 267/64.28; 137/102; 188/322.21; 251/63.4
[58] Field of Search .............. 267/64.28, 64.11, 64.12, 267/64.13, 64.14, 64.15–64.27, 119, 130, 124, 137, 113, 118; 188/322.21; 137/102; 251/63.4, 63.5; 91/442

[56] References Cited

U.S. PATENT DOCUMENTS

| | | | |
|---|---|---|---|
| 3,034,527 | 5/1962 | Hennells | 137/102 |
| 3,281,138 | 10/1966 | Oster | 267/64.28 X |
| 3,519,011 | 7/1970 | Pennanen | 267/64.28 X |
| 4,257,580 | 3/1981 | Schnitzius | 267/64.28 |
| 4,342,448 | 8/1982 | Wallis | 267/64.28 X |
| 4,550,899 | 11/1985 | Holley | 267/119 |
| 4,621,796 | 11/1986 | Fresch et al. | 267/64.28 |
| 4,662,616 | 5/1987 | Hennells | 267/64.28 |
| 4,664,141 | 5/1987 | Starr | 267/64.28 X |
| 4,664,362 | 5/1987 | Hennells | 267/119 |

Primary Examiner—Douglas C. Butler
Attorney, Agent, or Firm—Flynn, Thiel, Boutell & Tanis

[57] ABSTRACT

A gas spring unit having a housing, and a piston assembly slidably supported within and projecting outwardly of the housing. The housing and piston assembly cooperate to define therebetween a pressure chamber which is precharged with a high pressure gas, specifically nitrogen, for absorbing external shock forces as imposed on the piston assembly. A first passage, containing a one-way check valve, extends through the end cap of the housing to permit charging of the pressure chamber with high-pressure gas, and to additionally permit make up gas to be supplied to the chamber. A second passage extends through the end cap for relieving pressure within the pressure chamber, such as due to overload or when relief of pressure is desired. A movable discharge valve is associated with the second passage, and the opening and closing of the discharge valve is controlled by a control piston which is slidably disposed within the end cap and has opposite ends thereof exposed to the pressures within the first and second passages for controlling the position thereof, and hence controlling the position of the discharge valve.

13 Claims, 4 Drawing Figures

COMBINED CHECK AND EXHAUST VALVE FOR HIGH PRESSURE GAS SPRING

CROSS REFERENCE TO RELATED APPLICATION

This application is a continuation-in-part of my copending application Ser. No. 757,969, filed July 23, 1985, now U.S. Pat. No. 4,662,616.

FIELD OF THE INVENTION

This invention relates to a gas compression spring designed for use with high internal pressures and, in particular, to an improved valve arrangement associated with the spring for permitting safe discharge of the internal pressure from the spring and relief of excessive internal pressure.

BACKGROUND OF THE INVENTION

At the present time, manufacturers who utilize large presses and dies, such as of the type used for forming large sheet metal body parts for automobiles, have attempted to reduce the press size by replacing conventional low-pressure gas springs (typically air springs) with higher pressure springs which are typically filed with nitrogen. This desire to utilize high-pressure gas springs is obviously predicated on the fact that such springs can be of significantly smaller size while still providing a large force-absorbing capacity due to the high internal gas pressure which exists in the spring. These high-pressure springs, however, introduce serious concerns with respect to the safety of such devices and specifically the safety of operating personnel. This is important both during operation of the spring due to the pressure buildup therein during application of impact forces thereto, and also when handling of the spring such as during installation, maintenance or removal. Most known high-pressure springs do not contain control valves for providing safety against pressure overload, and at the same time providing convenient and safe procedures for discharging high-pressure fluid from the spring. Most manufacturers of such springs merely provide the spring with a one-way check valve which permits filling of the spring with a high-pressure gas such as nitrogen, and this check valve must then be manually held in an open position to permit relief of pressure from the spring when depressurization is desired. Having to perform such step is clearly undesirable when handling or maintaining of the spring unit is desired.

Accordingly, this invention relates to a high-pressure gas spring, specifically a nitrogen spring, and in particular to an improved spring having a valve arrangement which functions as a combined check and exhaust valve for permitting filling of the spring with a high-pressure gas, and for readily permitting depressurization of the gas spring substantially to atmospheric pressure in a safe and convenient manner. The valve arrangement additionally functions as a pressure release valve in that it will release excessive pressure from the gas spring in excess of a predetermined magnitude.

In the improved gas spring of the present invention, the valve arrangement employs a control piston which is slidably supported within a bore formed in the air spring housing. The control piston has an internal bore formed therein, and a one-way check valve is positioned therein. One end of this internal bore communicates with the outer end of the housing bore, which in turn communicates with a source of high-pressure gas. The other end of the internal bore communicates with the pressure chamber of the air spring. The high-pressure external gas source is capable of opening the one-way check valve for pressurizing the internal spring chamber, and for supplying makeup pressure in the chamber if a pressure loss occurs. An intermediate discharge passage extends from the pressure chamber to the inner end of the housing bore, and a valve element such as a ball is disposed within this inner end for closing off the intermediate discharge passage. A external discharge passage communicates between the inner end of the housing bore and a discharge reservoir (such as the atmosphere) which is at atmospheric pressure, this external discharge passage being of smaller cross section than the intermediate discharge passage. The source pressure is continuously supplied to the outer end of the housing bore and acts against the control piston for urging the latter towards the inner end, whereby the control piston maintains the valve element in a seated closed position so as to isolate the intermediate discharge passage from the housing bore. In the event of a pressure increase within the spring chamber in excess of a predetermined magnitude, than this is sufficient to urge the valve element and the piston into an open position and, since the external discharge passage is of a smaller cross section and hence effectively acts as a flow restriction, some of the high pressure gas accumulates within the inner end of the housing bore and acts on the control piston so as to move same away from the valve element and maintain the latter in its open position until the pressure in the spring chamber falls below the source pressure, at which time the source pressure moves the control piston back into its closed position.

With the arrangement of the present invention, as explained above, when it is desired to discharge the high-pressure gas from the air spring, such as for maintenance purposes, then the source pressure to the outer end of the housing bore is relieved so as to be substantially atmospheric. The higher pressure in the spring chamber then acts through the intermediate discharge passage and moves the valve element into an open position, whereupon the higher pressure then acts on the adjacent end of the control piston so as to move it away from the valve element so that the latter remains unrestricted in its open position. The high pressure hence then freely flows through the external discharge opening to the atmosphere until the pressure in the pressure chamber is substantially at atmospheric. When repressurization of the spring unit is desired, then a valve in the main supply line is opened so that pressure fluid is again supplied from the source to the outer end of the bore, which in turn moves the control piston against the valve element so as to seat it and hence close off the intermediate discharge passage from the external discharge passage.

The arrangement of the present invention hence provides a convenient and safe operation. Further, the valve arrangement is preferably integrated directly into the head plate of the spring housing so as to ensure that the spring is properly connected since the discharge valve is integrated with the one-way check valve used for controlling pressurization of the cylinder. This hence ensures that the spring unit cannot be improperly utilized and pressurized without ensuring the presence of the discharge control valve.

Other objects and purposes of the invention will be apparent to persons familiar with structures of this general type upon reading the following specification and inspecting the accompanying drawings.

Figure 1:
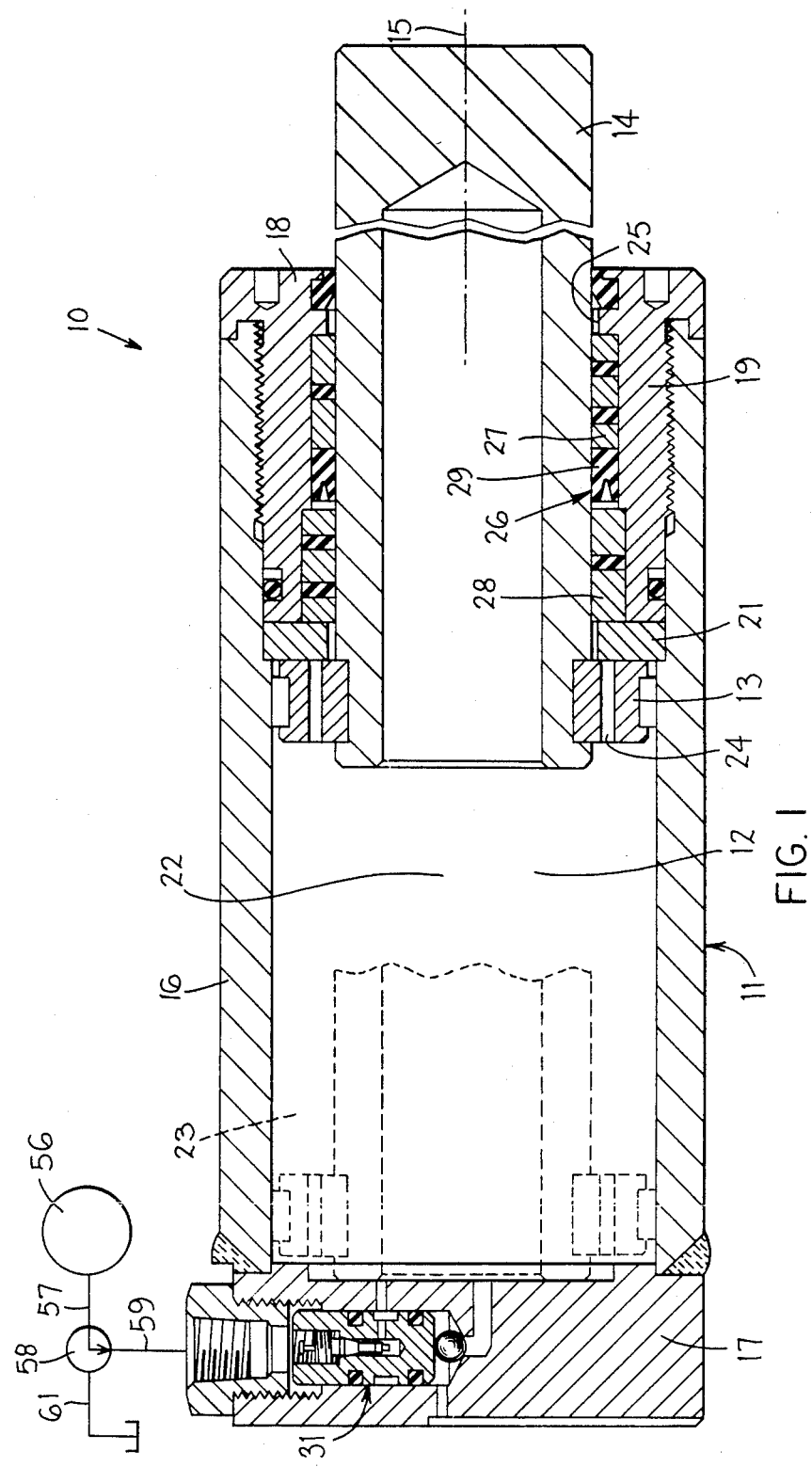
FIG. 1 is a central sectional view of the gas spring unit incorporating therein the improved valve arrangement of this invention.

Certain terminology will be used in the following description for convenience in reference only, and will not be limiting. For example, the word "upwardly", "downwardly", "rightwardly" and "leftwardly" will refer to directions in the drawings to which reference is made. The words "inwardly" and "outwardly" will refer to directions toward and away from, respectively, the geometric center of the spring unit and designated parts thereof. Said terminology will include the words specifically mentioned, derivatives thereof, and words of similar import.

DETAILED DESCRIPTION

FIG. 1 illustrates a gas spring unit 10 according to the present invention. The unit includes a substantially hollow housing 11 defining therein a pressure chamber 12. A piston 13 is disposed within the chamber 12 and is secured to the inner end of an elongated piston rod 14 which projects outwardly through one end of the housing, whereby the piston is supported for slidable movement along the longitudinal central axis 15 of the unit.

The housing includes a main body 16 which is of a tubular or sleevelike construction. The body 16 is closed at one end thereof by an end cap 17 which is fixed thereto, as by welding. The other end of body 16 has a further end cap 18 secured thereto, which end cap includes a sleevepart 19 which is received within and rigidly joined to the end of body 16, as by a threaded connection. An annular stop ring 21 which is stationarily positioned within the body 16 is disposed directly adjacent the inner end of the sleevepart 19.

The piston 13, which is fixed to the inner end of the piston rod 14 and is disposed in slidable engagement with the surrounding inner wall of the body 16, divides the interior compartment 12 into a pair of chambers, namely a main pressure chamber 22 and a balancing chamber or reservoir 23. The main pressure chamber 22 is defined rearwardly (that is leftwardly) of the piston 13 and in addition includes the hollow interior of the piston rod 14, whereas the reservoir or release chamber 23 is defined forwardly (that is rightwardly) of the piston and comprises the annular region between body 16 and piston rod 14, which annular region extends from the piston 13 to the stop ring 21. The piston 13 has one or more ports or orifices 24 extending axially therethrough to provide for unrestricted and continuous communication between the chambers 22 and 23 so as to balance the pressure on opposite sides of the piston.

The piston rod 14 projects outwardly of the housing through a central opening 25 formed in the end cap 18. This opening 25 has a packing structure 26 associated therewith for creating a slidable but sealed supportive engagement with the external surface of the piston rod. This packing structure 26, in the illustrative embodiment, includes a pair of axially spaced bushing rings 27 and 28 and an elastomeric seal ring 29 disposed therebetween.

The structure of gas spring 10, as described above, is explained in greater detail in my copending application Ser. No. 664,810, filed Oct. 25, 1984, now U.S. Pat. No. 4,664,362 the disclosure of which is incorporated herein by reference.

To permit filling and recharging of the pressure chamber 22 of the spring unit, and to additionally permit the high pressure within the spring unit to be relieved, either purposefully or in the event of a pressure overload, the spring unit 10 of this invention is provided with a valve assembly 31 associated therewith. This valve assembly 31 is preferably integrated directly into the housing, such as in the end cap 17, and provides control over the flow of pressure fluid both into and out of the pressure chamber 22.

The valve assembly 31 is disposed within a bore 32 as formed in the end cap 17, which bore has a threaded mouth 33 at the open end thereof for threadibly accommodating a conventional fitting 34, such as a threaded bushing. This fitting 34 has a standard threaded opening 35 therethrough which is aligned with and communicates with the bore 32 for permitting pressure fluid to be supplied thereto. The threaded opening 35 accommodates a conventional threaded end of a supply pipe, as described hereinafter. The fitting 34 has an inner end face 36 which effectively functions as a stop.

Bore 32, at a location intermediate the ends thereof, communicates with a transverse supply port 37 which is disposed in continuous communication with the pressure chamber 22.

The other or inner end of bore 32 terminates in an annular end wall 38 which is preferably of a concave conical configuration so as to function as a valve seat. This end wall 38, substantially at its center or apex, has one end of an intermediate discharge passage 39 formed therein, which passage 39 has its other end disposed in continuous communication with the pressure chamber 22. An external discharge passage 41 also communicates with the inner end of the bore 32, passage 41 at its other end communicates with the atmosphere or with a reservoir which is substantially at atmospheric pressure. The external discharge passage 41 has a cross-sectional area which is smaller than the cross-sectional area of intermediate passage 39, the area of passage 39 preferably being at least about twice the cross-sectional area of passage 41 for a purpose to be explained hereinafter.

The valve assembly 31 includes a control element 42 disposed for slidable but sealed support within the bore 32, which control element 42 is formed substantially as a piston or valve spool. The control piston 42 has oppositely directed end faces 43 and 44 formed on the opposite ends thereof, which end faces are of substantially the same area. The end face 43 is disposed adjacent the outer end of bore 32 and is disposed directly opposite the stop 36. The other end face 44 is disposed adjacent the inner end of bore 32 and is normally maintained in abutting engagement with a movable valve element 45, the latter preferably being formed as a spherical element or ball. This valve element 45 is of a diameter so as to sealingly seat against the valve seat 38 and hence close off the outer end of the intermediate passage 39 so as to prevent communication between the inner end of bore 32 and the pressure chamber 22.

The control piston 42 has a bore or opening 46 formed axially thereof, which bore 46 is of a stepped cylindrical configuration which opens inwardly from the outer end of the control piston and extends through only a selected axial extent of the piston. The outer end of this bore 46 hence is in direct communication with the opening 35. Bore or opening 46 has a one-way check valve 51 mounted therein, which check valve is disposed so as to permit flow therethrough into the lower part of opening 46 and thence through a radial passage 47 into a surrounding annular passage 48 as formed on the control piston. This annular passage 48 is somewhat axially elongated so as to always be in direct communication with the transverse supply port 37.

The check valve 51 includes a sleevelike housing 52 which is threadibly received within the bore 46 upstream of the radial passage 47. This housing 52 has an opening therethrough in which is positioned a valve element 53, the latter being normally spring urged (upwardly in FIG. 2) into a closed position so as to prevent the backward or outward flow of pressure fluid from the pressure chamber 22. The structure of the check valve 51 is conventional since it is constructed substantially identical to the standard check valve associated with automobile tires.

The valve assembly 31 defines control chambers 54 and 55 disposed respectively adjacent the outer and inner ends of the bore 32, whereby the pressure fluid within these chambers hence acts against the end faces 43 and 44 of the control piston 42 so as to either maintain the valve ball (that is, the discharge valve) 45 in the closed position illustrated by FIG. 1, or permit this discharge valve 45 to be moved into an open position when the control piston 42 is moved upwardly so as to abut the stop surface 36. The movement of the control piston 42 between these two limit positions, however, can be an extremely small distance inasmuch as only a small movement of the valve ball 45 is required.

To control the valve assembly 31 and the spring unit 10, the spring unit is preferably connected to a pressure source in a manner as diagrammatically illustrated in FIG. 1. That is, there is preferably provided a storage tank or chamber 56 containing therein a quantity of high pressure gas, such as nitrogen at a pressure level of about 2000 psi. This tank 56 is normally a closed tank containing therein a predetermined quantity of high pressure gas. This tank 56 communicates with a supply line 57 which connects to a control element 58, such as a three-way valve, and the latter connects to a further supply line 59 which has the end thereof threadibly engaged within the threaded opening 35 of the fitting 34. The valve 58 can also connect to a drain line 61, which drain may merely be a vent to the atmosphere. The valve 58 is normally maintained in a condition whereby lines 57 and 59 communicate with one another so that pressure within storage tank 56 is supplied to the bore 32, and the drain line 61 is normally closed, whereby the spring unit 10 and valve assembly 32 will thus normally be maintained in the positions illustrated by FIGS. 1 and 2.

OPERATION

Figure 2:
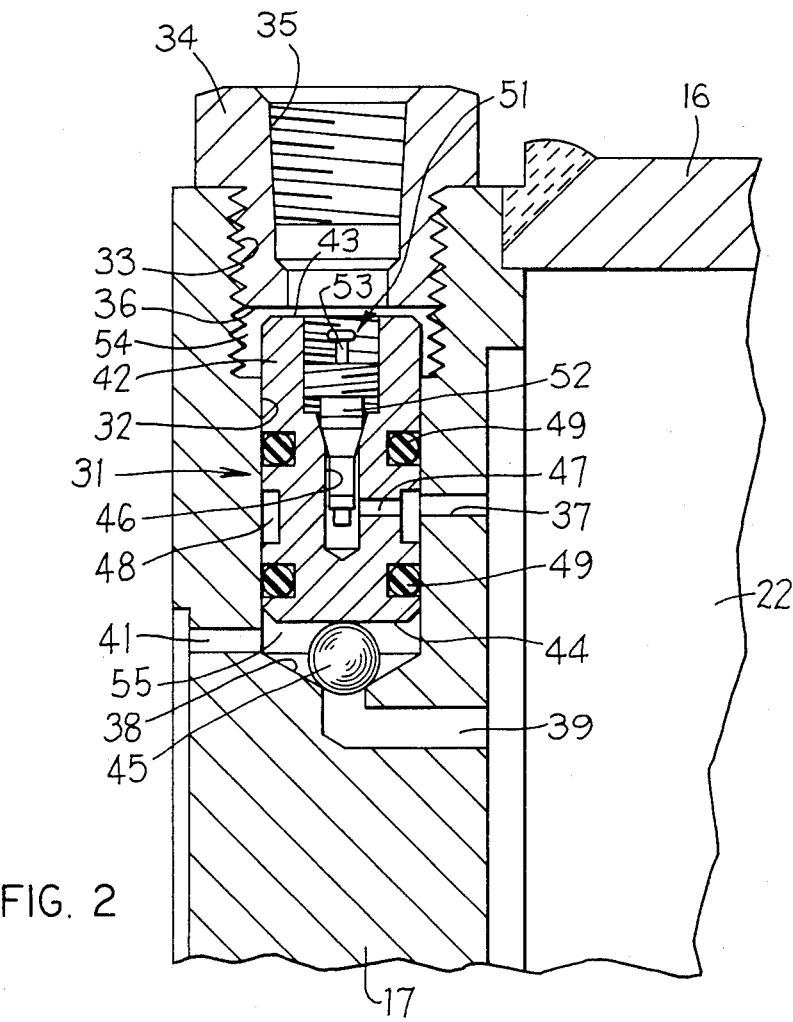
FIG. 2 is an enlarged sectional view of the valve arrangement.

With the spring unit in the position illustrated by FIGS. 1 and 2, a high pressure gas can be supplied to the spring unit to charge same by connecting the unit as illustrated in FIG. 1, whereby the high pressure gas flows from the source or tank 56 into the bore 32, which high-pressure gas opens the one-way check valve 51 so that the pressure fluid then flows through supply port 37 into the pressure chamber 22. When the pressure chamber 22 reaches the desired pressure as controlled by a pressure regulator (not shown), or when the pressure within chamber 22 substantially equals but is normally slightly less than the pressure within the tank 56, then the pressure within the chamber 22 coupled with the spring force associated with the check valve 51 moves the check valve 51 into its closed position. The spring unit 10 is hence charged with a high pressure gas, specifically nitrogen, at a pressure level which may be as great as 2000 psi. The piston rod 14 will normally be in its fully extended position as illustrated by FIG. 1 so as to permit imposition of an impact force thereon. If the pressure level within chamber 22 should experience any significant decrease in pressure, such as due to leakage, than after a predetermined pressure drop, additional high pressure fluid will automatically be supplied from tank 56 into chamber 22 due to automatic opening of the check valve 51 as caused by the pressure imbalance thereacross.

When an impact load is imposed against the end of piston rod 14 so as to cause inward movement of piston 13 and hence at least limited compression of the high pressure gas within the chamber 22, the compressed gas normally remains trapped within the spring unit since the one-way check valve 51 prevents backward flow of gas therethrough, and the valve ball 45 remains seated against the valve seat 38. In this regard, the supply pressure from tank 56, which pressure is at a high level substantially equal to the initial charging pressure, is present within the control chamber 54 and hence acts against the end face 43 of the control piston 42. This urges the control piston 42 downwardly against the valve 45, and in turn holds the valve 45 sealingly engaged against the valve seat 38. The higher pressure within the chamber 22, when an impact load is imposed on the spring unit, is transmitted into the intermediate passage 39 and imposed against the valve ball 45. The pressure area on the ball 45, however, is equal to the cross-sectional area of the passage 39, and this area is normally only a small fraction of the cross-sectional area of the piston 42, such as only about one-fifth and in the illustrated embodiment only about one-tenth the piston cross-sectional area. The pressure force imposed on the ball 45 during normal operation of the spring unit 10 is hence incapable of moving the ball 45 upwardly against the downward urging of the control piston 42, and hence the ball valve 45 remains closed.

However, if a pressure in excess of a predetermined magnitude should be developed within the pressure chamber 22, such as a pressure in the order of 20,000 psi in the illustrated embodiment, then the high pressure in the passage 39 acting against the small area of ball 45 is sufficient to overcome the smaller pressure which acts against the larger area of end face 43, and hence the ball 45 and piston 42 are moved upwardly a limited extent. Some of the high pressure fluid then immediately flows from pressure chamber 22 through passage 39 into the lower control chamber 55. Since discharge passage 41 is of smaller cross section and hence acts as a flow restrictor, a pressure buildup occurs within control chamber 55 so as to positively maintain the piston 42 in its uppermost position against the stop surface 36. This hence permits the high pressure within chamber 22 to be relieved due to the pressure fluid flowing through passage 39 into control chamber 55, and hence through the discharge passage 41 into the surrounding environment.

Since the pressure fluid from chamber 22 flows into control chamber 55 and pressurizes the latter, and acts against the end face 44 of the piston 42, the pressure in chamber 55 hence effectively overcomes or balances the pressure in the upper chamber 54 so that the piston 42 remains in its uppermost position until the pressure in the spring chamber 22 decreases to a safe operating level which is substantially equal to the initial charging pressure, at which point the pressure in the upper chamber 54 will exceed that in the lower chamber 55 so that the control piston 42 will again move downwardly so as to seat the valve ball 45 against the valve seat 38.

When it is desired to relieve the pressure from the spring unit, such as for maintenance purposes, the valve 58 can be manually moved so as to close off the supply pipe 57 and hence isolate the storage tank 56 from the spring unit. This hence results in supply pipe 59 being connected to the drain 61, and hence the bore 32 is exposed to atmospheric pressure. This thus relieves the pressure from the upper control chamber 54. Since the pressure within the pressure chamber 22 acts through passage 39 against the valve ball 45, this causes the valve ball 45 and the piston 42 to be moved upwardly into an open position until the piston abuts the stop surface 36. The high pressure fluid from chamber 22 then flows into the lower control chamber 55 and causes a pressure buildup therein due to the restriction caused by the discharge passage 41. The pressure hence acts against the lower and larger end face of the piston 42 so as to positively maintain it in its uppermost open position. The high pressure fluid in chamber 22 then flows through passage 39 into chamber 55, and thence through discharge passage 41 into the atmosphere. The valve assembly will be maintained in this open position until the pressure within chamber 22 substantially equals the surrounding atmospheric pressure Hence, the air spring unit can thus be utilized with high internal gas pressures therein so as to permit absorption of large forces, and at the same time the unit can handle such high pressures in a safe and controlled manner.

While the use of a valve 58 is illustrated solely for purposes of demonstrating one manner of isolating the storage tank and depressurizing the upper control chamber 54, nevertheless it will be appreciated that numerous other control arrangements or piping connections could be provided for accomplishing this purpose.

While the valve arrangement illustrated in FIG. 2 discloses the metal ball 45 being separate and independent of the control piston 42, it will be appreciated that the valve ball 45 and piston 42 could be fixedly joined together if desired, and in fact could be integrally formed. Further, the ball 45 could be replaced with a part which is integral with and projects axially from the control piston 42, which part would perform the same opening and closing function as the ball 45, but would do so by sliding into and out of the coaxially aligned end of passage 39 so as to selectively close and open the latter.

VARIATIONS

Figure 3:
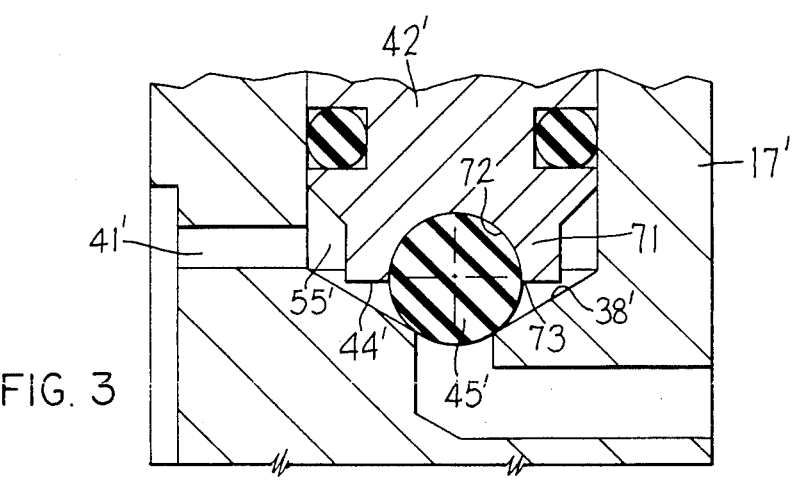
FIG. 3 is a fragmentary sectional view illustrating a variation of the valve arrangement shown in FIG. 2.

Referring now to FIG. 3, there is illustrated a variation of the valve arrangement, which variation relates specifically to the control piston and its cooperation with the valve ball. The parts shown in FIG. 3 which identically correspond to the same parts appearing in FIG. 2 have been designated by the same reference numerals but with the addition of a prime (') thereto.

The valve element or ball 45' in the FIG. 3 variation is constructed of an elastomeric material, rather than of metal. More specifically, the valve ball 45' is preferably constructed of polyurethane so as to provide the valve ball with at least limited elastomeric properties. However, the elastomeric material defining the valve ball 45' is hard and stiff so as to permit only limited deformation. To provide the desired properties, the polyurethane ball 35 preferably is provided with a Durometer hardness of about 90, although a Durometer hardness in the range of between about 70 and 100 is believed acceptable (the Durometer being a D scale rating). By providing the valve ball 45' with at least limited elasticity, this ensures that a proper annular seal is achieved between the ball 45' and the valve seat 38' in complete surrounding relationship to the intermediate passage 39', which seal must be maintained even when a high pressure level in the order of 2000 psi is experienced within the main pressure chamber 22.

To prevent the elastomeric ball 45' from undergoing a permanent deformation into a nonspherical condition, the valve ball 45' is preferably seated within a substantially semi-spherical valve seat 72 which is formed in the inner end of the control piston 42'. The piston 42' is provided with a reduced diameter portion 71 extending axially from the inner end thereof so as to permit formation of the valve seat 72 therein, and hence provide for supportive engagement with the elastomeric ball 45'. The provision of this valve seat 72 hence ensures that the control piston 42' supportingly engages the ball 45' over substantially one-half the exterior spherical area thereof, and hence minimizes the unit area pressure imposed on the elastomeric ball.

In the preferred embodiment, the depth of the seat or recess 72 preferably slightly exceeds the diameter of the valve ball 45', although the contour of the valve seat 72 is preferably generated on the same radius as the valve ball 45'. This hence results in the end surface 44' of the piston being disposed slightly below the center of the valve ball 45'. The inner edge 73 of the end surface 44' is preferably deformed inwardly a small extent to capture the ball 45' within the recess 72 and hence prevent separation therebetween.

Figure 4:
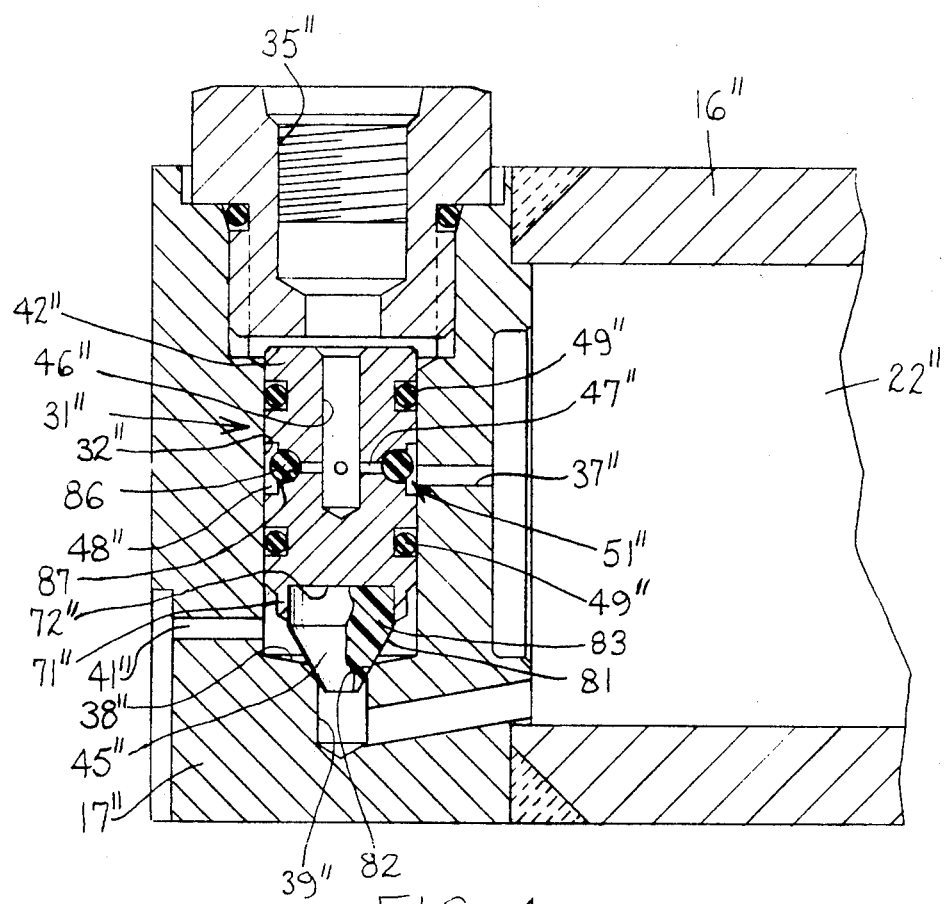
FIG. 4 is a sectional view of the valve arrangement similar to FIG. 2 but illustrating still further variations thereof.

Referring now to FIG. 4, there is illustrated additional variations of the valve arrangement, which variations relate specifically to the one-way check valve and the valve element as these latter are associated with the control piston. The parts shown in FIG. 4 which correspond to the same parts appearing in FIG. 2 have been designated by the same reference numerals but with the addition of a double prime (") thereto.

The valve element 45" is constructed substantially as a truncated cone in that it has an outer annular surface 81 which is of a truncated conical configuration which converges at it projects downwardly toward its free end. The conical surface 81 is defined by an included cone angle of about 60°, the latter being generated by an angle of 30° about the longitudinally extending axis of the valve element 45". This cone angle of 60° can vary by about plus (+) or minus (−) 20°. The annular end surface 38" on the housing or end plate 17" is formed, at its intersection with the coaxially aligned portion of the passage 39", with an annular valve seat 82 which is also of a conical configuration and is generated with substantially the same conical angle as the conical surface 81. The valve element 45" is preferably fixedly secured to the control piston 42" in coaxial alignment therewith, and for this purpose the valve element 45" has a substantially cylindrical mounting portion 83 associated with the large-diameter end of the cone. This cylindrical mounting portion 83 is surrounded by the reduced diameter end 71" of the control piston, and is fixedly seated (as by a press fit) within the cylindrical recess 72" formed in the lower end of the control piston.

The valve element 45" is formed of a hard plastic material which has only limited resiliency or elasticity, and which exhibits little cold flow characteristic. In particular, the valve element 45" is preferably constructed of an acetyl polymer, specifically polyoxymethylene, which material is commonly known as Delrin (trademark of DuPont). A high molecular density polymer, such as Delrin 150, is preferred.

By constructing the valve element 45" of a conical shape and of Delrin, it has been experimentally observed that the conical shape ensures a proper sealing seat between the surfaces 81 and 82, that the Delrin possesses at least limited resiliency so as to ensure that a proper sealing seat is achieved between these latter surfaces, and yet the valve element 45" can be urged under relatively high pressure into engagement with the valve seat 82 for long periods of time without undergoing any significant permanent deformation due to cold flow. Hence the valve element 45" can be opened and properly sealingly reclosed even after having been seated for long periods of time. Further, if there is any tendency for even a small degree of cold flow or set, the conical configuration and the cooperating conical valve seat still enable a proper sealing engagement to occur between the surfaces 81 and 82. This configuration of the valve element 45" has hence been observed to provide a much higher degree of reliability, particularly since the spring unit of this invention is subjected to rather high pressures and the valve element may be maintained in a closed seated position for rather long periods of time.

Still referring to FIG. 4, the valve arrangement also discloses an alternate one-way check valve associated with the supply passage. More specifically, the check valve 51 of FIG. 2 is replaced by the check valve 51" shown in FIG. 4. This latter check valve as defined by an elastomeric O-ring 86 of circular cross section, the latter being seated within an annular groove 87 as formed in surrounding relationship to the control piston 42". This annular groove 87 is formed inwardly from the bottom of the annular groove 48", with the groove 87 having a substantially semicylindrical bottom configuration so as to sealingly engage the elastomeric O-ring 86. The control piston 42" is, in this variation of the check valve 51', provided with a plurality of small-diameter passages 47" extending radially therethrough from the central bore or opening 46". The plurality of passages 47" are substantially uniformly angularly spaced around the control piston and are all disposed within a substantially single radial plane which intersects the surrounding groove 87. Hence, the radially outer ends of the passages 47" are thus sealingly closed due to the engagement of the O-ring 86. The natural resiliency of the O-ring 86 normally maintains the passages 47" closed so long as the pressure in the bore 46" exceeds the pressure in the pressure chamber 22" by less than a predetermined amount. However, when the pressure in bore 46" exceeds the pressure in chamber 22" by an amount greater than this predetermined differential, then the internal pressure in bore 46" and passages 47" is sufficient to elastically deform the O-ring 86 outwardly and hence permit the pressure fluid to escape from the passages 47" into the surrounding annular passage 48", and thence through the passage 37" into the pressure chamber 22". Any pressure build-up within the chamber 22", however, is prevented from flowing backwardly past the O-ring 86.

In the present invention, there are preferably at least four radial passages 47" spaced uniformly angularly around the control piston 42". Further, each of these passages 47" has a cross-sectional diameter which is preferably no greater than about one-third the diameter of the O-ring 86 since if the passages 47" are of much larger diameter in relationship to the O-ring diameter, then a desirable seal and check valve function may not be achieved. For example, the passages 47" are preferably of about 0.030 inch diameter, whereas the O-ring 86 is preferably of about 0.093 inch diameter.

It will be appreciated that the check valve 51" of FIG. 4 could be utilized in conjunction with the valve arrangement shown by FIGS. 2 and 3, and similarly the valve element 45" of FIG. 4 can be used in conjunction with the valve arrangement illustrated by FIG. 2.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. In combination, a gas spring arrangement comprising:

a gas spring unit having a housing, a piston rod means relatively slidably supported within said housing and projecting outwardly therefrom, the piston rod means being slidably movable relative to the housing between a first position wherein the rod means extends outwardly of the housing through a substantial extent and a second position wherein the rod means is substantially telescoped within the housing, the housing and the rod means cooperating to define a pressure chamber therebetween for containing a quantity of high-pressure gas therein;

first passage means formed at least partially in said housing and communicating with said pressure chamber for supplying high-pressure gas thereto;

one-way check valve means associated with said first passage means for permitting high-pressure gas to be supplied into said pressure chamber while preventing flow of said gas in the opposite direction;

second passage means formed at least partially in said housing for providing communication between said pressure chamber and a low-pressure discharge point, such as the atmosphere;

flow-control valve means associated with said second passage means for controlling flow of pressure fluid therethrough from said pressure chamber to said low-pressure discharge point, said flow-control valve means including an annular valve seat associated with and surrounding said second passage means, and a movable control valve element movable between open and closed positions, said control valve element when in said closed position being disposed in sealing engagement with said annular valve seat for preventing flow through said second passage means to said low-pressure discharge point;

said first passage means at least upstream of said check valve means being independent of and sealingly isolated from said second passage means at least downstream of said annular valve seat; and control means for controlling movement of said flow control valve element between said open and closed positions, said control means including first means responding to the pressure in said first passage means upstream of said check valve means and second means responsive to the pressure in said second passage means downstream of said annular valve seat for controlling movement of said control valve element between said open and closed positions.

2. A combination according to claim 1, wherein said control means comprises a control piston which is slidably supported on said housing and is sealingly engaged with the housing to permanently sealingly isolate said first passage means upstream of said check valve means from said second passage means downstream of said annular valve seat.

3. A combination according to claim 2, wherein said control valve element is fixed to and projects coaxially of said control piston for simultaneous movement therewith, said valve element having an axially outwardly projecting portion of a generally conical configuration defining thereon an annular conical surface which is adapted to be moved into direct sealing engagement with the annular valve seat when the valve element is in said closed position, said conical portion being constructed of a relatively hard plastic material which does not exhibit any significant cold flow properties.

4. A combination according to claim 3, wherein the valve element is constructed of Delrin.

5. A combination according to claim 3, wherein the annular valve seat is of a truncated conical configuration which extends at substantially the same slope as the conical surface on the valve element.

6. A combination according to claim 3, wherein the housing includes a bore in which the control piston is slidably and sealingly supported, said first passage means including an inlet passage which communicates with one end of said bore, said first means being defined by one end of said control piston so that said one end is acted on by the pressure of the gas within said inlet passage, said second passage means including an intermediate passage which extends from said pressure chamber to said valve seat, said intermediate passage including at least a portion thereof which coaxially communicates with said bore adjacent the other end thereof, said valve seat being defined substantially at the interface between said bore and said intermediate passage, said second means being defined on said control piston adjacent the other end thereof, said valve element being fixed to and projecting axially outwardly from said other end of said control piston, said second passage means also including a discharge passage which communicates between the low-pressure discharge point and said bore adjacent said other end thereof, said discharge passage being of smaller cross-sectional area than said intermediate passage.

7. The combination according to claim 2, wherein said first passage means includes an inlet passage which extends through said housing into the interior of said control piston, a plurality of small radial passages which communicate with said interior and project radially outwardly through said control piston, said radial passages being angularly spaced apart within substantially the same plane which extends perpendicular with respect to the longitudinal extent of the control piston, and a further passage which provides communication between the pressure chamber and the radial passages, said check valve means being associated with said radial passages and including an annular elastomeric O-ring disposed in surrounding relationship to and mounted on said control piston for normally sealingly closing off the radially outer ends of said radial passages, said control piston having a surrounding annular groove in which said O-ring is sealingly seated, said radial passages having the radially outer ends thereof terminating directly into the bottom of said surrounding annular groove.

8. A combination according to claim 7, wherein said radial passages have a cross-sectional diameter which is no greater than about one-third the cross-sectional diameter of said O-ring.

9. A combination according to claim 8, wherein the valve element is fixed to and projects coaxially of the control piston for movement therewith, the valve element having an axially outwardly projecting portion of a generally conical configuration defining thereon an annular conical surface adapted to be moved into direct sealing engagement with the annular valve seat when the valve element is in said closed position, said conical portion being constructed of a relatively hard rubberlike material, and the annular valve seat being of a truncated conical configuration extending at substantially the same slope as the conical surface on the valve element.

10. A combination according to claim 3, wherein the first passage means extends at least in part through the control piston and includes an annular passage disposed in surrounding relationship to said control piston and at least one further passage which projects at least radially outwardly of the control piston so as to terminate in said annular passage, and said check valve means including an annular elastomeric O-ring disposed within said annular passage in surrounding relationship to the control piston for normally sealingly closing off the downstream end of said further passage.

11. A combination according to claim 2, wherein said control element is fixed to and projects coaxially of said control piston for simultaneous movement therewith, said valve element having an axially outwartdly projecting portion of generally circular cross section defining thereon a surrounding annular surface which is adapted to be moved into direct sealing engagement with the annular valve seat when the valve element is in said closed position, said control valve element being constructed of a relatively hard rubberlike material having a Durometer hardness in the range of between about 70 and 100 so that the valve element has limited elasticity.

12. A combination according to claim 11, wherein the projecting portion of the valve element is of a generally truncated conical configuration which defines an included cone angle of about 60° and which is of converging configuration as it projects axially outwardly from the control piston toward the free end of the projecting portion.

13. In combination, a gas spring arrangement comprising:

a gas spring unit having a housing, a piston rod means relatively slidably supported within said housing and projecting outwardly therefrom, the piston rod means being slidably movable relative to the housing between a first position wherein the rod means extends outwardly of the housing through a substantial extent and a second position wherein the rod means is substantially telescoped within the housing, the housing and the rod means cooperating to define a pressure chamber therebetween for containing a quantity of high-pressure gas therein;

first passage means formed at least partially in said housing and communicating with said pressure chamber for supplying high-pressure gas thereto;

one-way check valve means associated with said first passage means for permitting high-pressure gas to be supplied into said pressure chamber while preventing flow of said gas in the opposite direction;

second passage means formed at least partially in said housing for providing communication between said pressure chamber and a low-pressure discharge point, such as the atmosphere;

flow-control valve means associated with said second passage means for controlling flow of pressure fluid therethrough from said pressure chamber to said low-pressure discharge point, said flow-control valve means including an annular valve seat associated with and surrounding said second passage means, and a movable control valve element movable between open and closed positions, said control valve element when in said closed position being disposed in sealing engagement with said annular valve seat for preventing flow through said second passage means to said low-pressure discharge point;

said first passage means at least upstream of said check valve means being independent of and sealingly isolated from said second passage means at least downstream of said annular valve seat;

control means for controlling movement of said flow control valve element between said open and closed positions, said control means including first means responding to the pressure in said first passage means upstream of said check valve means and second means responsive to the pressure in said second passage means downstream of said annular valve seat for controlling movement of said control valve element between said open and closed positions;

said control means comprising a control piston which is slidably supported on said housing and is sealingly engaged with said housing to sealingly isolate said first passage means upstream of said check valve means from said second passaage means downstream of said annular valve seat, said control piston having the first and second pressure faces formed on opposite ends thereof, said first pressure face being exposed to the pressure in said first passage means upstream of said check valve means, and said second pressure face being exposed to the pressure in said second passage means downstream of said annular valve seat;

said control valve element being axially fixed to and projecting coaxially outwardly from said control piston beyond said control piston, said valve element having a part which projects axially outwardly of the control piston for seating and sealing engagement with the valve seat when the valve element is in said closed position, said part being of a generally truncated conical configuration which converges as it projects axially outwardly toward the valve seat, said part being constructed of a relatively stiff rubberlike material, and the annular valve seat being of a truncated conical configuration extending at a slope which substantially corresponds to the slope of said part.

* * * * *

UNITED STATES PATENT AND TRADEMARK OFFICE
CERTIFICATE OF CORRECTION

PATENT NO. : 4 721 289

DATED : January 26, 1988

INVENTOR(S) : Ransom J. Hennells

It is certified that error appears in the above-identified patent and that said Letters Patent is hereby corrected as shown below:

Column 14, line 24; after "piston beyond" insert ---said second pressure face for simultaneous movement with---.

Signed and Sealed this

Twenty-seventh Day of September, 1988

Attest:

DONALD J. QUIGG

Attesting Officer

Commissioner of Patents and Trademarks